Patented May 16, 1950

2,507,751

UNITED STATES PATENT OFFICE 2,507,751

WELDING FLUX

Alvin L. Bennett, National City, Calif., assignor to Solar Aircraft Company, San Diego, Calif., a corporation of California No Drawing. Application August 30, 1948, Serial No. 46,931

2 Claims. (Cl. 148—26)

This invention relates to welding fluxes, and has as a general object to provide a flux that is particularly useful in the welding of "super alloys" containing high percentages of chromium and high percentages of nickel and/or cobalt.

A more specific object is to provide a welding flux for super alloys that has superior wetting action, low surface tension, that does not form harmful compounds in the alloy welded, maintains a protective blanket over the whole range of temperatures during the welding operation, and forms a dense, impervious slag that protects the metal during the cooling stage.

Advantageous features of the flux are that it is effective with a large number of alloys in addition to the super alloys, and forms a slag that is brittle and easily removed when cold.

The preferred composition and possible variations therefrom are given in the following table, the proportions being given in percentages by weight:

| Ingredient | Preferred proportion | Possible range |
|---|---|---|
| | Per cent | Per cent |
| Calcium fluoride | 74 | 55-81 |
| Sodium fluoride | 18 | 16-24 |
| Lithium fluoride | 2 | 1-5 |
| Borax glass | 3 | 2-16 |
| Boron oxide | 3 | 2-16 |

The ingredients, in the form of anhydrous powders containing less than 0.25% water and of fineness such that 95% passes a 200 mesh screen, are mechanically mixed and stored in dry form. Prior to use, the powder is mixed with alcohol to form a paint of creamy consistency that is applied to the work to be welded, and permitted to dry.

Methanol is commonly used as the vehicle, although other alcohols are satisfactory provided the water content is under 3%.

The alcohol reacts with the boron oxide to cause the paint to adhere tightly to the work during and following drying.

The flux may be used to coat both the front and rear surfaces of the work and also the welding rod, in gas welding, and unshielded arc welding. With gas-shielded arc welding it is necessary only to use the flux on the rear surface of the work.

Although, as indicated in the table, limited variations in proportions from the preferred composition give workable fluxes, the effectiveness drops off with departures from the preferred proportions. The preferred mixture of calcium and sodium fluorides melts at a low temperature and seems to be particularly effective in producing a low surface tension of the weld metal.

In general, increasing the sodium fluoride increases the fluidity of the fused flux, and vice versa. Increasing the lithium fluoride increases the cost, without much change in fluidity, but decreasing it reduces the fluidity. Increasing the borax glass can be harmful by causing boron contamination of the work, and decreasing it reduces fluidity and destroys the balance between the fluorides of low and high melting points respectively; thus decrease of the borax glass might raise the initial melting point of the flux above the temperature at which oxidation of the metal could begin. Increasing the boron oxide may also cause boron contamination of the work, and reducing it lessens the adhesive properties of the flux coating at low temperatures.

The preferred flux has superior wetting quality on high alloy materials because of the particular balance between the fluorides of different melting points, and it does not produce boron or carbon contamination of such alloys, as many fluxes do. If there is too high a percentage of calcium fluoride, the lower melting lithium and boron compounds may burn out before the calcium fluoride melts sufficiently to protect the metal. Conversely, if the percentage of boron and lithium compounds is too high the melt will be too fluid and will tend to run away from the hottest parts of the metal.

All ingredients of the flux fuse at relatively low temperatures during the welding operation, thereby maintaining a complete blanket, and the dissolving action of the fluorides starts below the oxidation temperature of the super alloys and continues with increasing effectiveness throughout the heating range.

In addition to giving good results with the super alloys, with which most fluxes are relatively ineffective, the present flux has more universal application to alloy steels generally, than any flux previously known to me.

As has been previously indicated, the present flux forms a dense, impervious slag that protects the metal during the cooling stage, but is brittle and easily removed after it has cooled.

The present flux is the only one known to me that is satisfactorily on some cobalt-base alloys such as Vitallium (H. S. 21) and H. S. 31, which for this reason have not previously been recommended for welded fabrications. When used on these alloys, the prior art fluxes failed to provide impervious blankets at the welding temperatures.

The following table identifies and gives the nominal compositions (in percentages by weight) of the alloys herein referred to as "Super Alloys."

in anhydrous form in approximate proportions by weight: calcium fluoride 74%; sodium fluoride 18%; lithium fluoride 2%; borax glass 3%; and boron oxide 3%.

ALVIN L. BENNETT.

SUPER ALLOYS
*(Nominal Composition % by Weight)*

|  | Iron preponderance | | Nickel preponderance | | | | Cobalt preponderance | | |
|---|---|---|---|---|---|---|---|---|---|
|  | S590 | N155 | Inconel | Inconel X | Nimonic 80 | Hastelloy C | S816 | Vitallium (HS-21) | HS-31 |
| Mo | 4 | 3 |  |  |  | 15-25 | 4 | 5-7 |  |
| Cr | 20 | 20 | 14 | 14 | 21 | 10-20 | 20 | 28-32 | 25-28 |
| Mn |  | 1.5 |  |  |  | 0.1-1.5 | 1.5 | 0.20-1.0 |  |
| Si |  | .5 |  |  |  | [1] 1.0 | .5 | .1-1.0 |  |
| C | 0.4 | .0-.2 |  |  |  | [1] 0.3 | .4 | 0-0.5 | .4-.5 |
| V |  |  |  |  |  | .01-0.5 |  |  |  |
| Cb | 4 | 1.0 |  | 1.0 |  |  | 4 |  |  |
| Ti |  |  |  |  | 2.5 |  |  |  |  |
| W | 4 |  |  | 2.5 |  |  | 4 |  | 7.5 |
| Fe | Bal. | 30 | 7 | 7.0 |  | 5-15 | 3 |  |  |
| Ni | 20 | 20 | Bal. | Bal. | Bal. | Bal. | 20 |  | 10-12 |
| Co | 20 | 20 |  |  |  |  | Bal. | 60-65 | Bal. |
| N |  | .14 |  |  |  |  |  |  |  |
| Al |  |  |  | .8 | .5 |  |  |  |  |

[1] Not more than.

Although for the purpose of explaining the invention, a particular embodiment thereof has been described, certain departures from the preferred composition can be made without departing from the invention, and I therefor do not wish to be limited to the exact composition described.

I claim:

1. A fluxing powder consisting of an unreacted mechanical mixture of powdered ingredients and consisting of the following ingredients in anhydrous form by weight: calcium fluoride 55-81%; sodium fluoride 16-24%; lithium fluoride 1-5%; borax glass 2-16%; and boron oxide 2-16%.

2. A fluxing powder consisting of an unreacted mechanical mixture of powdered ingredients and comprising as its essential ingredients,

REFERENCES CITED

The following references are of record in the file of this patent:

UNITED STATES PATENTS

| Number | Name | Date |
|---|---|---|
| 881,081 | Kovach | Mar. 3, 1908 |
| 1,968,984 | Binder | Aug. 7, 1934 |
| 2,053,408 | Pfanstiehl | Sept. 8, 1936 |

FOREIGN PATENTS

| Number | Country | Date |
|---|---|---|
| 32,696 | Denmark | Dec. 31, 1923 |